INVENTORS
CORNELIS VAN DER LELY
ARY VAN DER LELY

INVENTORS
CORNELIS VAN DER LELY
ARY VAN DER LELY

United States Patent Office 2,939,265
Patented June 7, 1960

2,939,265

SIDE DELIVERY RAKING DEVICE

Cornelis van der Lely and Ary van der Lely, Maasland, Netherlands, assignors to C. van der Lely N.V., Maasland, Netherlands, a Dutch limited company Filed Jan. 26, 1955, Ser. No. 484,165

Claims priority, application Netherlands Jan. 29, 1954

7 Claims. (Cl. 56—377)

This invention relates to devices for laterally displacing material lying on the ground and of the type comprising a frame with at least one raking member.

Known devices of this type are characterized by the deficiency that when operating on uneven terrain they are likely to be damaged or to leave behind material in depressions in the terrain.

It is an object of this invention to provide a device of the above mentioned kind which is adapted to work efficiently and with practically no losses on uneven terrain.

According to the invention means are provided permitting individual movement of one or more teeth, the latter engaging the ground or the substance thereon. Further, means are provided to keep said teeth in a favorable attitude to perform their raking action both in normal and in deflected positions.

Other objects, features and details of the invention will appear from the following description with reference to the accompanying drawing in which an embodiment of the invention is illustrated by way of example and in which.

Figure 1:
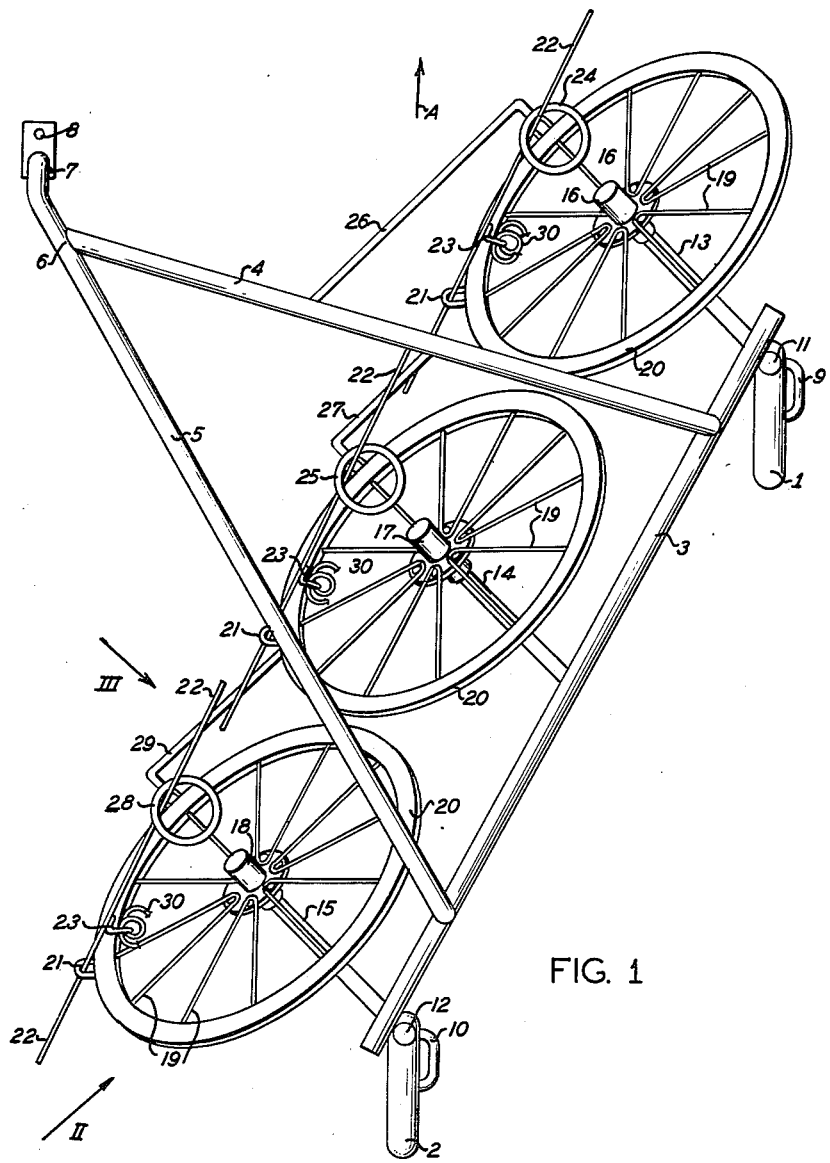
Fig. 1 is a plan view of a preferred embodiment of the invention.
Figure 2:
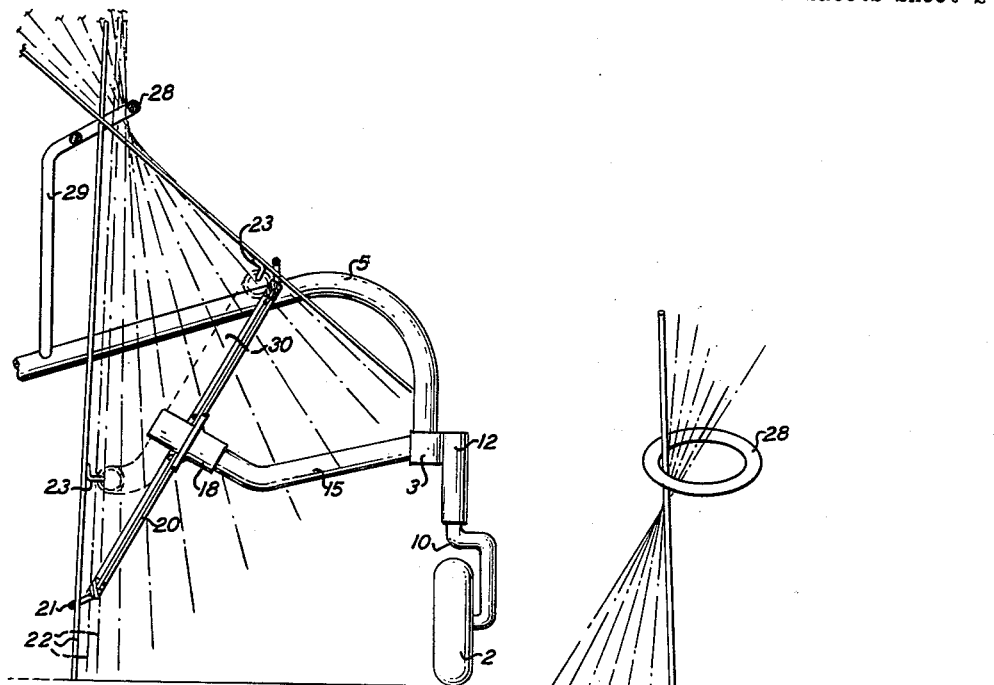
Fig. 2 shows part of the device of Fig. 1 in side elevational view in the direction of arrow II in Fig. 1.
Figure 3:
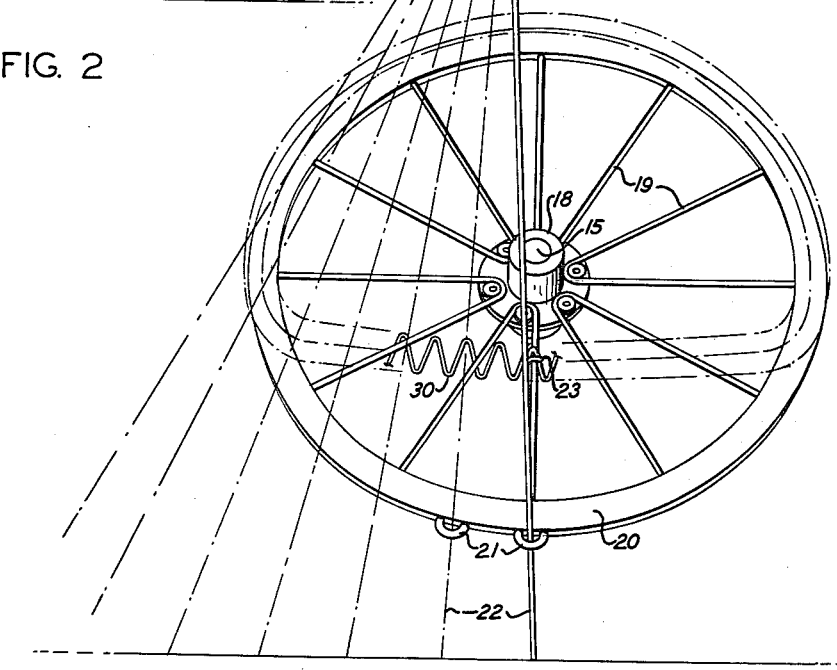
Fig. 3 shows, in enlarged scale, a front elevational view of the same part of the device, viewed in the direction of arrow III in Fig. 1.

The device illustrated in Figs. 1-3 comprises two running wheels 1 and 2, a frame or girder 3 supported by said wheels and two beams 4 and 5 connected respectively to the girder 3 in proximity to the wheels 1 and 2. The bars 4 and 5 extend upwardly from the girder 3 and then gradually downward to point 6 at which the bars 4 and 5 are connected together (see Fig. 1). Near this point 6 the bar 5 terminates in a flat horizontal part 7 which is provided with an opening 8. By means of this part, the device can be fixed behind a tractor for moving the device in the direction of arrow A. The horizontal axles of the running wheels 1 and 2 are integral with vertical axles 9 and 10 rotatably mounted in bushings 11 and 12 secured to the girder 3. The axle 9 and/or the axle 10 may be locked against rotative movement by any suitable locking means (not shown). If the vertical axle of a wheel 1 or 2 is not locked, the associated wheel forms a self-adjusting running wheel.

The girder or frame 3 carries three parallel axles or journals 13, 14 and 15 extending forwardly and upwardly in oblique direction, hubs 16, 17 and 18 being respectively mounted upon said journals for free rotation. Each hub carries a plurality of flexible spokes 19 by means of which a rim or wheel 20 is connected to the hub. Each rim 20 is inclined to the horizontal and has in cross section the shape of a channel turned with its opening directed toward the hub so that the ends of the spokes can freely extend into the channel of the rim, by which the rim can be easily subjected to a considerable deflection in an axial direction.

Along the periphery of each rim loops or guides 21 are provided at regular intervals, only one of said guides being shown in Fig. 1 for each rim 20. Through each guide 21 extends a raking bar or rod 22 in the shape of a stiff steel wire or elongated member having at a predetermined height a substantially closed loop 23. The plane of said loop is approximately at right angles to the longitudinal direction of the rod. The upper ends of the rods on the same rim are guided by a further guide located vertically above the lowermost point of the rim. The guides 24 and 25 located above the rims 20 supported by the hubs 16 and 17, respectively, are fixed relative to said rims by means of rods 26 and 27 connected to the beam 4, whereas the third ring or guide 28 is connected by a rod 29 to the beam 5.

The loops 23 in the rods 22 associated with the same rim are all situated above said rim. A helical spring 30 of steel wire passes through all of said loops, and between each pair of consecutive loops are located a few windings of the helical spring. The ends of the helical spring are connected together, so that the spring is a closed loop. Each structure constituted by a hub, spokes, a rim, a set of rods and guides constitutes a raking member.

The operation of the device is as follows: When the running wheel 2 is secured in the position shown in Fig. 1 and the device is towed by means of the coupling member 7 in the direction of the arrow A, the lower ends of the lowermost rods 22 of each rim 20 are in contact with the ground. As the loops 23 cannot move through the guides 21 and, due to the presence of the endless helical spring 30, cannot even rest upon the rim 20, the rods are retained in the associated guides. The rods 22, which are in contact with the ground, are those which are in the most erect position. The loops 23 of these rods are not located near the guides 21 through which the corresponding rods extend, but are spaced above said guides.

Since the device is moved forward in the direction of the arrow A and the hubs 16, 17 and 18 are freely rotatable on their axes, the lower ends of the rods, which serve as teeth or catching means for the material lying on the ground, will remain behind due to the resistance of the ground and/or the material lying thereon. At the same time, said lower ends of the rods are forced to move to the left, because the rim 20 and the guides 24, 25 and 28 permit only a restricted movement with regard to the device. Thus the rim, spokes and hub are put into rotation so that the rods come sequentially into contact with the ground. Due to the presence of the spring 30, the contacting of the ground by the rods is effected gradually and without shock. Due to the lateral movement of the sticks, the lower ends thereof, which serve as teeth, will force the encountered material aside by a predetermined distance. The material delivered in lateral direction by the foremost raking member, after having been disengaged by said raking member, will be caught, together with other material on the ground by the middle raking member and conveyed further aside. The material displaced by this raking member will be finally caught by the hindmost raking member and delivered still further in the sideways direction.

It will be evident that, since the rods 22 are readily slidable in their longitudinal direction both through the guides 21 and through the guides 24, 25, and 28, the lower ends of the rods will be able to adapt themselves to any difference in elevation of the ground within wide limits. Consequently, irregularities in the terrain cannot decrease the raking action. It is of special importance that the positions of the teeth are not changed unfavorably during deflection, as would be the case if a plurality of flexible teeth were to be rigidly fixed to the rims 20. In the latter case, the adaptation to differences in elevation is effected by a bending of the teeth, due to which the point of each tooth takes a very unfavorable position for raking action. In the device shown in Figs. 1–3, any unfavorable change of position of the teeth is avoided, which is due to the fact that the upper portion of each rod is guided in two members that are favorably located with respect to each other. The upper part of each rod thus constitutes a means to keep its lower end in favorable position for raking action.

What is claimed is:

1. A raking implement comprising a frame, a wheel rotatable on said frame, at least one guide on said wheel and rotatable therewith, a second guide on the frame, said wheel being freely rotatable relative to said second guide, an elongated member slidably supported in both said guides and including a portion extending outwardly of said wheel, and means operatively associated with said elongated member for retaining said member in said guides.

2. An implement as claimed in claim 1 wherein, with the wheel rotated so that the first said guide is in lowermost position, the first said guide is vertically below the second said guide.

3. An implement as claimed in claim 1 wherein said wheel is inclined to the horizontal.

4. An implement as claimed in claim 1 wherein said means comprises at least one loop on said elongated member.

5. An implement as claimed in claim 1 comprising running wheels on said frame.

6. An implement as claimed in claim 1 comprising a plurality of guides on said wheel and including the first said guide and an elongated member operatively associated with each of the same, the second said guide slidably accommodating all of the elongated members.

7. An implement as claimed in claim 6 comprising a spring engaging all of said elongated members and yieldably restricting the movement thereof.

References Cited in the file of this patent

UNITED STATES PATENTS

| | | |
|---|---|---|
| 468,382 | Beck | Feb. 9, 1892 |
| 2,158,299 | Oppenheim | May 16, 1939 |
| 2,508,454 | Goodwin | May 23, 1950 |
| 2,514,699 | Hiatt | July 11, 1950 |
| 2,667,730 | McCall et al. | Feb. 2, 1954 |
| 2,680,343 | Enos | June 8, 1954 |
| 2,811,009 | Plant | Oct. 29, 1957 |